CIRCUIT ARRANGEMENT FOR SHIFTING A PULSE OCCURRING AT AN ARBITRARY INSTANT TO ONE OF TWO GIVEN INSTANTS OF A PULSE CYCLE

Filed Jan. 11, 1961

INVENTOR
ANTONIE WIJBE VAN'T SLOT
HANS KOK
BY Frank R. Jifari
AGENT

United States Patent Office 3,189,834
Patented June 15, 1965

3,189,834

CIRCUIT ARRANGEMENT FOR SHIFTING A PULSE OCCURRING AT AN ARBITRARY INSTANT TO ONE OF TWO GIVEN INSTANTS OF A PULSE CYCLE

Antonie Wiebe van 't Slot and Hans Kok, Hilversum, Netherlands, assignors to North American Philips Company, Inc., New York, N.Y., a corporation of Delaware Filed Jan. 11, 1961, Ser. No. 82,096
Claims priority, application Netherlands, Jan. 21, 1960, 247,610
3 Claims. (Cl. 328—63)

This invention relates to a circuit for shifting a pulse occurring at an arbitrary instant to one of two given instants of a pulse cycle. The need for such an arrangement exists for example, in telegraphy systems. In order to obtain a practical embodiment of the apparatus for further processing of the telegraph signal it may be efficacious to convert the incoming telegraph signal into sequential incoming code groups of which the code elements occur all at a given instant of repeating pulse cycles. A preparation for the shift of the code elements to one given fixed instant of the pulse cycles is preferably, if not necessarily carried out by first shifting the incoming pulses to one of two given instants of the pulse cycles. The invention has for its object to provide a circuit by which this aim can be attained. In accordance with the invention the input terminal of the arrangement is connected to setting terminals of two storing one-shot generators, of which the output terminals are connected to the input terminal of a non-storing one-shot generator, of which the output terminal is connected to the output terminal of the whole arrangement and also to an input terminal of each of the two storing one-shot generators. Each of the storing one-shot generators have a second input terminal, which terminals are connected to a supply terminal of the circuit.

One embodiment of the invention will be described more fully with reference to the drawing.

Figure 1:
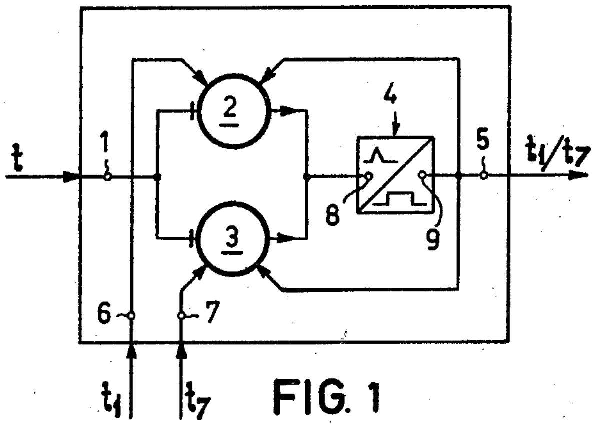
FIG. 1 is a block diagram of a circuit according to the invention.

Referring to FIG. 1, reference numeral 1 designates the input terminal of the arrangement. This terminal is connected to the setting terminal of a storing one-shot generator 2 and to the setting terminal of a storing one-shot generator 3. A storing one-shot generator is to be understood to mean herein a circuit having at least three terminals, which are distinguished as a setting terminal, an input terminal and an output terminal. The circuit supplied an output pulse only when first a pulse of adequate strength and duration and of a given polarity is conveyed to the setting terminal (setting of the generator) and then a pulse of adequate strength and duration and also of given polarity is conveyed to the input terminal (firing of the generator). Once a generator has been fired, it is not capable of supplying an output pulse again until it is reset. In other words, the firing of a previousl unset generator has no effect.

The output terminals of the generators 2 and 3 are connected to the input terminal 8 of a non-storing one-shot generator 4, of which the output terminal 9 is connected to the output terminal 5 of the complete circuit and, moreover, to an input terminal of each of the generators 2 and 3. A non-storing one-shot generator, which may be a blocking oscillator, is understood herein to be a circuit which delivers a single output pulse when it is excited by an input pulse or an incoming alternating current, but which is then blocked for a predetermined time before it can respond to a new input pulse to deliver another output pulse. A second input terminal of the generator 2 is connected to a supply terminal 6, to which, at a given instant of the pulse cycles, clock pulses are fed, for example at the instant $t_1$ of the pulse cycles. The generator 3 comprises also a second input terminal, which is connected to a supply terminal 7. To the supply terminal 7 are fed, at a different instant of the pulse cycles, clock pulses, for example at the instant $t_7$ of the pulse cycles. In total a pulse cycle may contain, for example, twelve instants, in which case the time interval between $t_1$ and $t_7$ is equal to the time interval between $t_7$ and $t_1$, if the instants are evenly distributed over the pulse cycles.

The circuit arrangement operates as follows: it is assumed that the arrangement receives a pulse at an instant $t$ lying between $t_1$ and $t_7$. At this instant $t$ the two generators 2 and 3 are set. At the instant $t_7$ following the instant $t$ the generator 3 is fired and it supplies an output pulse which excites the non-storing generator 4. The latter therefore supplies an output pulse at the instant $t_7$, which pulse is also the output pulse of the whole circuit. This output pulse fires the generator 2. The pulse supplied by the latter amplifier has, however, no effect on the generator 4, since the latter is then in the blocked state. The final result is that the pulse coming in at the instant $t$ lying between the instants $t_1$ and $t_7$ is shifted to the instant $t_7$ by the circuit. In a similar manner a pulse coming in at an instant $t$ lying between an instant $t_7$ and the next following instant $t_1$ is shifted by the circuit to the instant $t_1$. The situation becomes, however, somewhat uncertain, when the pulse comes in at an instant lying very near, for example, the instant $t_7$. In this case it is not certain whether the generator 3 will supply an output pulse, since this generator will then be set and fired substantially at the same instant. This uncertainty, however, does not apply to the generator 2, which is previously set by a pulse received at input terminal 1 and which does not receive a firing pulse at the instant $t_7$. If the generator 3 supplies an output pulse at the instant $t_7$ of sufficient strength to excite the non-storing generator 4, the process occurs as described above. If the generator 3 does not supply an output pulse at the instant $t_7$ or if it supplies an output pulse of insufficient strength to excite the generator 4, the generator 4 and hence the whole circuit does not supply an output pulse at the instant $t_7$. Then, however, at the instant $t_1$ generator 2 is fired. The output pulse supplied by generator 2 excites the generator 4, which thus supplies an output pulse which is also the output pulse of the whole circuit and which also fires the generators 2 and 3. The latter action has no effect, since the generator 2 has been previously fired and the generator 3 is at the most capable of supplying a parasitic output pulse, which does not have any effect on the generator 4. As any rate the incoming pulse is transferred, which can take place only at the instant $t_1$ or $t_7$.

Figure 2:
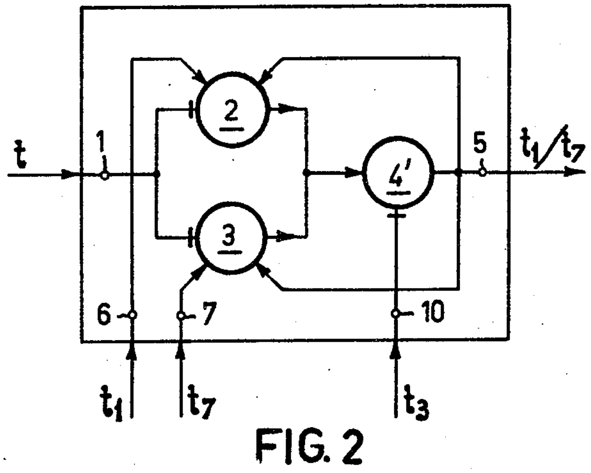
FIG. 2 is a block diagram of a modified circuit according to the invention.

The generator 4 of the arrangement shown in FIG. 1 may be replaced by a storing one-shot generator 4′ (see FIG. 2), of which the input terminal is connected to the output terminals of the two generators 2 and 3, of which the setting terminal is connected to a third supply terminal 10 of the arrangement and of which the output terminal is connected to the first input terminals of the generators 2 and 3 and to the output terminal 5 of the whole circuit. This generator 4′ is to be set at an instant differing from $t_1$ and $t_7$, for example at the instant $t_3$ of the pulse cycles.

Figure 3:
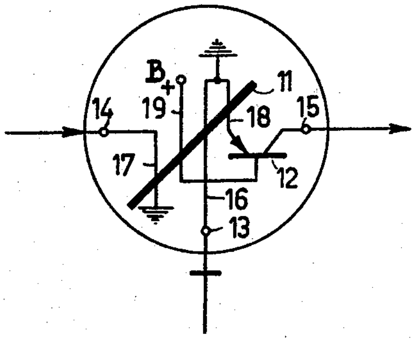
FIG. 3 shows the circuit diagram of a storing one-shot generator within the symbol employed.

The invention does not depend upon the nature of the storing one-shot generators used. A very practical generator of this type is described by S. S. Gutermann and W. M. Carey, Jr., in Conventional Records I.R.E., 3, No. 4, London, 1955, pages 84–94 (a transistor magnetic core circuit; a new device applied to digital computing techniques). FIG. 3 shows the circuit diagram of this generator within the symbol used. In this figure reference numeral 11 designates an annular core of a material having a rectangular magnetic hysteresis loop, 12 designates a pnp-transistor, 13 the setting terminal, 14 the input terminal, 15 the output terminal, 16 a setting winding connected to the setting terminal, 17 a input winding connected to the input terminal, 18 a feed-back winding connected via the emitter-collector path of the transistor 12 to the output terminal and 19 a control-winding connected on the one hand to a low positive voltage source $B_+$ and on the other hand to the base of the transistor 12. The winding senses of the various windings is evident from the manner in which the lines representing these windings intersect the thick line segment which represents the annular core 11. Each winding is indicated in the drawing by a wire passing once through the core 11, but in practice each winding may have more than one turn. A possible proportioning of this pulse amplifier is described in copending United States patent application Serial No. 819,076, filed June 9, 1959, now Pat. No. 3,079,589.

This storing one-shot generator operates as follows: it is supposed that the generator is in the non-set condition (core 11 in position 0). By conveying a current pulse of given polarity and of adequate strength and duration to the setting terminal 13, the generator arrives into the set condition (core 11 in position 1). The change-over of the core 11 from the position 0 to the position 1 induces a voltage into the control-winding 19, which voltages renders the base of the transistor 12 further positive than it already was, so that the transistor 12 remains blocked. If then a pulse is conveyed to the input terminal 14, the core 11 starts changing over and the voltage thus induced into the control-winding 19 overcomes the voltage supplied by the voltage source $B_+$. The base of the transistor 12 thus becomes negative and the transistor becomes conductive, which means that the output terminal 15 supplies a current pulse. The current then flowing through the feed-back winding 18 drives the core 11 also into the position 0, so that this current is capable of taking over the function of a firing pulse. Even when the firing pulse has already terminated before the core 11 has reached the position 0, this core will continue moving into the position 0 until this position is reached, since the function of the firing pulse is taken over completely by the current conveyed by the transistor 12 through the feed-back winding 18. As soon as the core 11 has reached the position 0, no voltage is any more induced into the control-winding 19, so that the base of the transistor 12 again becomes positive and this transistor no longer conveys current to the output terminal 15. The result therefore is such that the generator supplies, by firing, an output pulse and arrives into the non-set condition. By suitable proportioning this output pulse may have a sharply defined amplitude and duration within given limits. The firing pulse need not meet other requirements than that it should drive the core 11 adequately far into the steep part of its hysteresis to induce a voltage into the control winding 19, which voltage is capable of overcoming the voltage of the voltage source $B_+$ and hence of rendering the voltage negative at the base of the transistor 12. The setting pulse must, of course, be adequately strong to move the core 11 completely into the position 1. It is furthermore evident that firing of a previously fired but subsequently not reset generator has no effect. It is furthermore obvious that the storing one-shot generator may be provided with two or more input terminals connected to separate input windings. In this case the generator can be fired by conveying a firing pulse to any of its input terminals.

What is claimed is:

1. A circuit for shifting an input pulse to one of two predetermined instants of a pulse cycle, said circuit comprising a source of said input pulse, a source of clock pulses providing pulse cycles each having first and second clock pulses at first and second predetermined instants, respectively, first and second storing one-shot generators each having at least a setting terminal, an output terminal, and first and second input terminals, means applying said input pulse to the setting terminals of said first and second storing one-shot generators, means applying said first and second clock pulses to the first input terminals of said first and second storing one-shot generators, respectively, a third one-shot generator having a third input terminal and an output terminal, means connecting the output terminals of said first and second generators to said third input terminal, means connecting the output terminal of said third one-shot generator to the second input terminals of said first and second storing one-shot generators, and output circuit means connected to the output terminal of said third one-shot generator.

2. A circuit for shifting an input pulse to one of two predetermined instants of a pulse cycle, said circuit comprising a source of said input pulse, a source of clock pulses providing pulse cycles each having first and second clock pulses at first and second predetermined instants, respectively, first and second storing one-shot generators each having at least a setting terminal, an output terminal, and first and second input terminals, means applying said input pulse to the setting terminals of said first and second storing one-shot generators, means applying said first and second clock pulses to the first input terminal of said first and second storing one-shot generators, respectively, a non-storing one-shot generator having a third input terminal and an output terminal, means connecting the output terminals of said first and second generators to said third input terminal, means connecting the output terminal of said non-storing generator to the second input terminals of said first and second one-shot generators, and output circuit means connected to the output terminal of said non-storing generator.

3. A circuit for shifting an input pulse to one of two predetermined instants of a pulse cycle, said circuit comprising a source of said input pulses, a source of clock pulses providing pulse cycles each having first and second clock pulses at predetermined instants respectively one-half cycle apart and a third clock pulse at a third predetermined instant, first storing one-shot generator means having a first setting terminal, a first output terminal, and first and second input terminals, second storing one-shot generator means having a second setting terminal, a second output terminal, and third and fourth input terminals, third storing one-shot generator means having a third setting terminal, a third output terminal and a fifth input terminal, means applying said input pulse to said first and second setting terminals, means applying said first clock pulse to said first input terminal, means applying said second clock pulse to said third input terminal, means applying said third clock pulse to said third setting terminal, means connecting said first and second output terminals to said fifth input terminal, means connecting said third output terminal to said second and fourth input terminals, and output circuit means connected to said third output terminal.

References Cited by the Examiner

UNITED STATES PATENTS 2,830,179 4/58 Stenning ............ 328—61

JOHN W. HUCKERT, *Primary Examiner.*

ARTHUR A. GAUSS, *Examiner.*

UNITED STATES PATENT OFFICE
CERTIFICATE OF CORRECTION

Patent No. 3,189,834

June 15, 1965

Antonie Wijbe van 't Slot et al.

It is hereby certified that error appears in the above numbered patent requiring correction and that the said Letters Patent should read as corrected below.

Column 1, line 62, for "previousl" read -- previously --; column 2, line 48, for "the instant", second occurrence, read -- the next following instant --.

Signed and sealed this 12th day of July 1966.

(SEAL)
Attest:

ERNEST W. SWIDER
Attesting Officer

EDWARD J. BRENNER
Commissioner of Patents